(12) United States Patent
Greene

(10) Patent No.: US 9,905,125 B2
(45) Date of Patent: Feb. 27, 2018

(54) REMOTE CONTROL WITH MICROPHONE USED FOR PAIRING THE REMOTE CONTROL TO A SYSTEM AND METHOD OF USING THE SAME

(71) Applicant: EchoStar Technologies L.L.C., Englewood, CO (US)

(72) Inventor: Gregory H. Greene, Littleton, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 15/050,219

(22) Filed: Feb. 22, 2016

(65) Prior Publication Data

US 2017/0243474 A1  Aug. 24, 2017

(51) Int. Cl.
*G08C 17/02* (2006.01)
*G08C 19/28* (2006.01)
*H04N 21/422* (2011.01)

(52) U.S. Cl.
CPC ............. *G08C 17/02* (2013.01); *G08C 19/28* (2013.01); *H04N 21/42203* (2013.01); *G08C 2201/20* (2013.01); *G08C 2201/31* (2013.01); *G08C 2201/92* (2013.01)

(58) Field of Classification Search
CPC .......................... G08C 19/28; H04N 21/42203
USPC ................. 340/12.23, 12.21, 12.24
See application file for complete search history.

(56) References Cited

U.S. PATENT DOCUMENTS

| | | | | |
|---|---|---|---|---|
| 8,736,427 B2 * | 5/2014 | King | ...................... | G06F 13/385 340/12.22 |
| 2006/0176188 A1 * | 8/2006 | Cho | ...................... | G08C 17/02 340/12.23 |
| 2012/0178371 A1 * | 7/2012 | Patel | ...................... | G08C 17/00 455/41.3 |
| 2012/0280803 A1 * | 11/2012 | Sutardja | ................. | G08C 17/02 340/12.23 |
| 2014/0023375 A1 * | 1/2014 | Gilson | ................... | G08C 17/02 398/106 |

* cited by examiner

*Primary Examiner* — Qutbuddin Ghulamali
(74) *Attorney, Agent, or Firm* — Seed Intellectual Property Law Group LLP

(57) ABSTRACT

According to the principles as disclosed herein, a remote control contains a microphone. The microphone inside the remote control picks up the audio content of all surrounding sound in the room in which is it located. Specifically, if a program is being presented for viewing and listening on a particular A/V system, a remote control with a microphone will hear the program which is being presented at the same time that the system is sending the signal to its own speakers. The A/V system then receives a signal from the remote control providing the audio signal that that remote control has received. If the audio signal which the remote control has received matches the audio signal which the A/V system output to its speakers to broadcast into the room, then the A/V system will switch to be able to receive input from that particular remote control.

11 Claims, 5 Drawing Sheets

REMOTE CONTROL WITH MICROPHONE USED FOR PAIRING THE REMOTE CONTROL TO A SYSTEM AND METHOD OF USING THE SAME

BACKGROUND

Technical Field

This disclosure is in the field of controlling an A/V system with a remote control and, in particular, to the use of a microphone in a remote control in order to pair that remote control with the system which is creating the sound.

Description of the Related Art

Many homes have multiple TV sets, set-top boxes, stereo systems, movie theater rooms, and different places in which audiovisual content can be viewed. Frequently, each of these systems has their own remote control. Currently, in order to control a particular A/V system in a room, the remote control is paired to that particular system, whether it be a set-top box, TV set, stereo system, or the like. The same home may have a similar or, in many cases, an identical A/V system in a different room. That A/V system in a different room will be viewed by different people, and has its own remote control, which will control the operation of the A/V system in that room.

Accordingly, the remote control, which will control one of the A/V systems, is compatible with and emits the very same signals for each of the A/V systems in each of the three rooms. It is thus possible that if a person is changing channels on the remote control in one room, the signals emitted by that remote control, whether RF or IR, will be picked up by the A/V systems in the other rooms, and they would also recognize it as a request to change the channel.

Currently, in order to prevent an A/V system in one room from being controlled by a remote control that is in a different room, a particular remote control is paired to uniquely control an A/V system, and similarly, the A/V system is uniquely paired to respond only to that remote control. Namely, the A/V system has a code stored therein in which it will recognize and respond to only a single remote control with which it is paired, and even though it may receive signals from other remote controls, it will not respond. This particular solution is beneficial in that it ensures that a particular A/V system can only be controlled by one remote control, and it will ignore interference from all other sources, whether they are other A/V remote controls, a Bluetooth input, a cellphone, some other device that is emitting RF signals, IR signals, or some other source of input. Thus, while it is very convenient to ensure that a particular A/V system is not accidently controlled by the wrong remote control, it has the disadvantage that only one remote control can control that particular A/V system.

There may be a situation in which it is desired to quickly and easily permit a different remote control to control a particular A/V system, even one it is not paired with, without complex programming.

BRIEF SUMMARY

The microphone inside the remote control picks up the sound coming from the A/V program currently being viewed and converts this sound to a pulse-code modulation (PCM) signal. The PCM signal is then stored briefly inside of the remote control so that it has a record of the program being broadcast by the A/V system in the room in which the remote control is located.

More particularly stated, the system, in one embodiment, operates as follows. At the same time the A/V system is outputting the sound into the room, the source of the program has sent the audio signal to the speakers so the speakers will generate the sound. Accordingly, the A/V controller also has the audio data stored in memory that it has sent to the speakers to be broadcast into the room. The microphone in the remote control has picked up that same audio data after it has been broadcast. The remote control converts this audio sound to a PCM signal and transmits the PCM signal to the A/V system which is outputting the signal to the speakers. The A/V system receives the signal from the remote control and compares the audio data that it received from the remote control to the audio data that it has most recently broadcast. If there is a match, then the A/V system is configured to receive signals from that remote control in order to control it.

In one particular embodiment, the A/V system contains an antenna which receives signals from the remote control. These signals can be of two different types. A first type is a signal in order to control the operation of the A/V system using button presses, such as selecting the channels, starting the recording of a program, increasing or decreasing the volume, and other operations of the A/V system controlled by pressing a button on the remote control. A second type of data that can be sent by the remote control is also available if the remote control contains a microphone. Namely, the sound which the remote control has received at the microphone can be transmitted as an additional separate signal to the antenna.

The user may use voice commands in order to control the A/V system. In particular, the user can speak the words to control, such as "volume up," or "volume down." The user may also change channels by speaking a particular channel number, such as "channel 4" or "change to channel 21." The user may also use verbal commands to control other portions of the A/V system. The microphone will pick up the verbal commands, convert these to the appropriate audio data inside the remote control, and transfer this audio data to the A/V system. The A/V system may then use its controller in order to take the requested action.

In addition to receiving voice commands from the user of the remote control, the microphone will also be picking up the audio sound which is being broadcast by the A/V system at the moment that it is being broadcast. It converts this to a PCM signal and then sends this audio data to the A/V system, which has just broadcast that same data as part of the program being presented by the A/V system. The A/V system receives the audio data signal from the remote control and, if it matches the audio data which the same A/V system has just sent to the speakers for broadcasting into the room, then the A/V system is able to confirm that the remote control is in the same room. Therefore, a user that is holding that remote control can be considered to be in the same room, and within hearing distance of the speakers. Once the A/V system has confirmed that there is a match between the audio data which the microphone on the remote control picked up and the audio data signal which A/V system sent to broadcast on the speakers, then the A/V system will permit the new remote control to be able to control its functions, such as changing channels, changing the volume, and other functions.

In one embodiment, after the A/V system implements a function that it is to be controlled by a different remote control, it will send a signal to all the other A/V systems that are on the same network, indicating to those other A/V systems that it is now being controlled by a new remote control which previously it had not been paired with. After it sends a signal to the other A/V systems on the network, then they will ignore signals from this particular remote control. Namely, the A/V system that was paired with this remote control will enter a mode in which it will ignore output by that particular remote control. The remote control will control only the new set-top box and it will not control the one it was previously paired with. The server in the A/V system, which has decided that a remote control can control it, will notify all the other A/V systems in the same network. The A/V system which had the most recent audio data match will be the only A/V system that responds to that remote control, and all other A/V systems will ignore it.

There may be some instances in which a single A/V system may be controlled by two different remote controls. For example, an A/V system may be paired with a first remote control, which was usually done during initial setup of the system. If a person holding a second remote control enters the room, and the microphone on that remote control picks up the program which is currently being broadcast from the speakers, it will send a signal to the antenna letting the A/V system know that it is within range to hear the audio signal output by that particular A/V system. The A/V system can be controlled by this new remote control.

In a first embodiment, the TV accepts input from both remote controls, namely, either remote control will have the ability to change channels, increase the volume, decrease the volume, or perform other functions. This is particularly convenient if the first remote control has been lost, is in a distant corner of the room that is hard to retrieve, or is otherwise not convenient to use. It may also be beneficial if the person who has entered the room desires to control the operation of the TV contrary to the person then watching the program. For example, if a parent enters the room and a teenager has the sound on too loud, or is watching an inappropriate program, the parent, holding the remote control to their own A/V system, can enter the room which contains the A/V system of the teenager, and within a few moments, usually less than one second, after their microphone has received the audio data and then matches to the A/V system which has output the audio data, their remote control will be able to, reduce the volume, or take other actions. It may also be the situation, if the music being output is loud enough to be heard in different rooms, that the remote control in a different room hears the sound being broadcast by an A/V system. It may be temporarily matched to be able to control that A/V system and thus, even though the remote control has not entered the room, it is given sufficient control over that A/V system to reduce the volume, change the channel, or take other steps, even though it has not entered the same room. Since the matching is based on the remote control receiving the same audio data which the A/V system broadcasts to its own speakers, the control can change as long as the microphone of the remote control can hear the sound which is output by that particular A/V system.

In one embodiment, both remote controls remain active for that same A/V system, even though one is individually paired and the other one is temporarily matched with it, so that the A/V system can receive signals and respond to signals from either remote control.

In an alternative embodiment, once a new remote control is matched to an A/V system using the microphone pickup and signal which has been fed back to the same A/V system, then all other remote controls are disabled from being able to control that A/V system, and it now has a unique correspondence to that particular remote control so that it will not respond to input from any other remote controls except the one which has been most recently matched to it based on the audio signal. According to this embodiment, the person who enters the room carrying a remote control will therefore be able to uniquely control that A/V system once there is a match between the program being broadcast by it and the signal which is being received by the microphone in the remote control.

In a preferred embodiment, the unique pairing of the first remote control to an individual A/V system remains stored in the memory of the A/V system and the match to a new remote control is on a temporary basis. The match remains active only for that period of time when the microphone in the remote control is receiving a similar signal output by the audio speakers of the A/V system. The matching can remain in effect as long as the remote control sends, on a regular basis, a confirmation of the audio signal it is receiving and the match is confirmed on a periodic basis. For example, the match might be confirmed once per minute, or in some cases more frequently, or in other cases less frequently, such as once every hour. Once the remote control leaves the room so it is no longer in the audio range of the A/V system which is outputting the signal, then the A/V system no longer receives the signal output by the remote control which matches this audio data which it is outputting, and the match link is terminated. Upon termination of the match to that particular A/V system, it will send a signal to all the other A/V systems on the network to inform them that it is no longer being controlled by that particular remote control. Accordingly, the A/V system to which it was originally paired will be able to receive signals from it and be controlled by it.

These, and other embodiments, will be described in more detail below.

DETAILED DESCRIPTION

Figure 1:
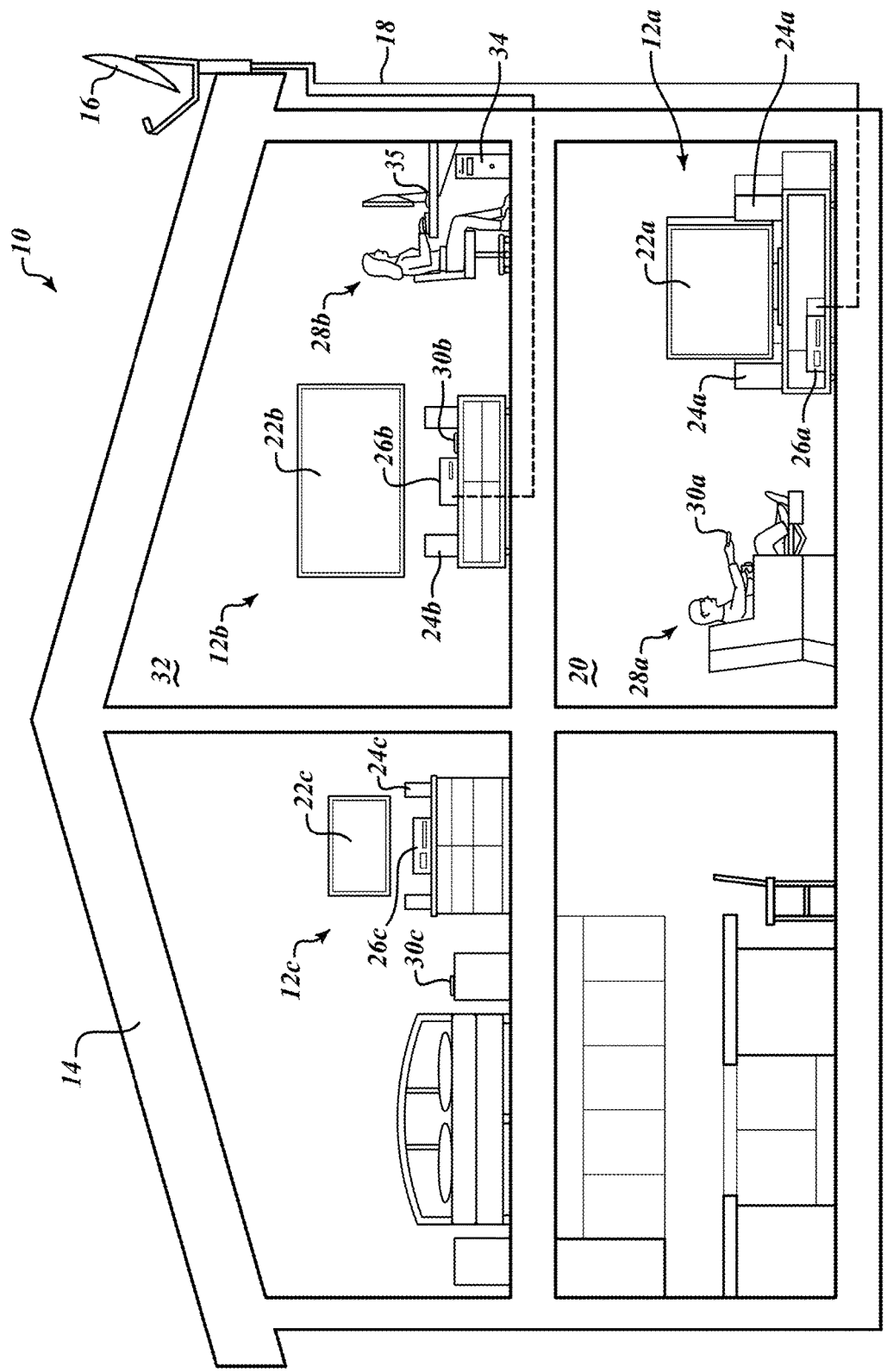
FIG. 1 is a schematic of a home having a network with a plurality of A/V systems, each one in a different room.

FIG. 1 illustrates a network 10 having a plurality of A/V systems 12 connected to the same network. In the particular example shown, the network 10 is inside a single home 14. The home 14 has a satellite dish 16 which receives a satellite signal which has been broadcast, such as output by Echo-Star, DISH Network, or other satellite broadcast system. The program signal is received by the satellite dish 16 and then carried on cables 18 to the various A/V systems 12 located in different rooms of the house. The input for each of the A/V systems 12 could also be a ground-based cable, such as that used by a cable provider, a TV or radio broadcast system, an Internet system or a similar type input provided by many companies and delivered over optical fibers or other systems. Thus, the cables 18 represent the signal line into the home that receives the A/V program which is available to be viewed and heard on that particular A/V system 12.

Figure 2:
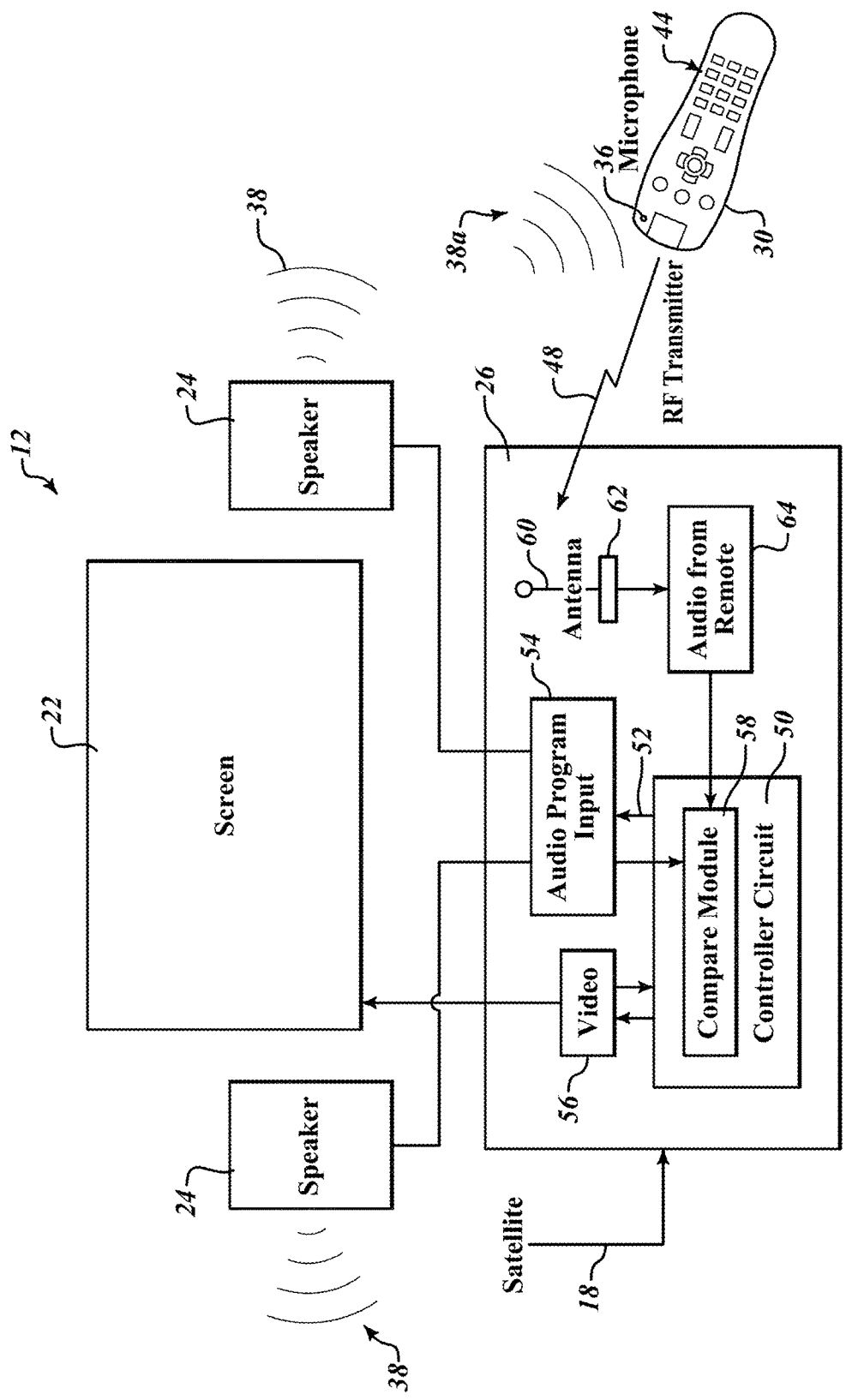
FIG. 2 is a block diagram of an A/V system as controlled by a remote control according to principles as disclosed herein.

As shown in FIG. 2, each A/V system 12 preferably has at least four components. A display 22 to view the video content; speakers 24, on which the audio signal is broadcast; a controller 26, such as a set-top box, microprocessor, or the like; and a remote control 30, which controls the A/V system. In the example provided in FIG. 1, when a particular A/V system 12 is being referred to, it will be designated with a common letter to match each of the components. For example, the A/V system 12a has a display 22a, speakers 24a, a controller 26a, and remote control 30a.

In the example of FIG. 1, there is a movie theater viewing room 20 which has a large display screen 22a and a plurality of speakers 24a which output the sound corresponding to the program then being shown on the display screen 22a. A set-top box 26a is the controller 26 that receives the program signal on cable 18 and, based on the selection of the user, will broadcast the selected program by showing the display on the display screen 22a and outputting the corresponding sound on speakers 24a. A user 28 holds a remote control 30a, and by pressing keys on the remote control 30a, the user is able to select which of the many available programs the user desires to see on the system 12a in the particular room in which they are watching TV.

The same network 10 also has another A/V system labeled 12b, in an office 32 in which a person may occasionally view a broadcast, but may also be doing work. As can be seen, the room 32 is an office which contains a desk 35 and a computer 34, in which a user 28 is able to work at the computer and at the desk. This office also contains an A/V system 12b, speakers 24b, and a controller 26b. A remote 30b is also provided to control the A/V system 12b.

The network 10 also contains yet another A/V system 12c that is in a different room, in this example, a bedroom. The A/V system 12c has a display 22c, speaker 24c, a controller 26c, and a remote control 30c to control the various functions thereof.

Each of the remote controls 30 is paired to the A/V system 12 which it controls. Specifically, the remote 30a is paired to the A/V system 12a, the remote 30b is paired to the A/V system 12b and the remote 30c is paired to the A/V system 12c. When a remote control 30 and an A/V system are paired, it means that the A/V system 12 will only respond to commands from the particular remote control 30 with which it is paired. The remote control 30a outputs a signal that is in the RF band. Namely, a radio signal, which generally has a range of one hundred feet or more. Therefore, when the user 28a presses a button on the remote control 30a to control the A/V system 12a, the radio signal which is transmitted carries through the entire network 10 and is received by the A/V systems 12b and 12c. The codes in the other A/V systems of the network, other than the one with which the remote control 30a is paired, are set to ignore all signals except from their own specific remote control they are paired with. Therefore, when a signal is output by a remote control 30a, it is received by the A/V systems 12b and 12c but they ignore these systems because they are not paired with that particular remote control. The A/V system 12a is paired to remote control 30a and therefore it responds to signals output by the remote control 30a.

The prior art in which one A/V system 12a is permanently paired to one and only one unique remote control 30a has some disadvantages. It may be that the remote which controls that A/V system is temporarily misplaced, or even lost. In such a circumstance, the user cannot control the A/V system 12a with a remote control and must use the manual buttons on the system itself. In addition, a user may forget which of the remote controls 30 is paired to a particular A/V system 12. In order to assist the user, the remote controls 30 are often labeled with numbers, such as 1, 2, 3, in order to distinguish which of the A/V systems 1, 2, or 3 within a network 10 they are paired with. However, since the remote controls 30 often look the same, a user may carry one into the other room without realizing that he has the wrong remote control for the A/V system in that particular room. Thus, some improvements over the prior art are possible.

Figure 3:
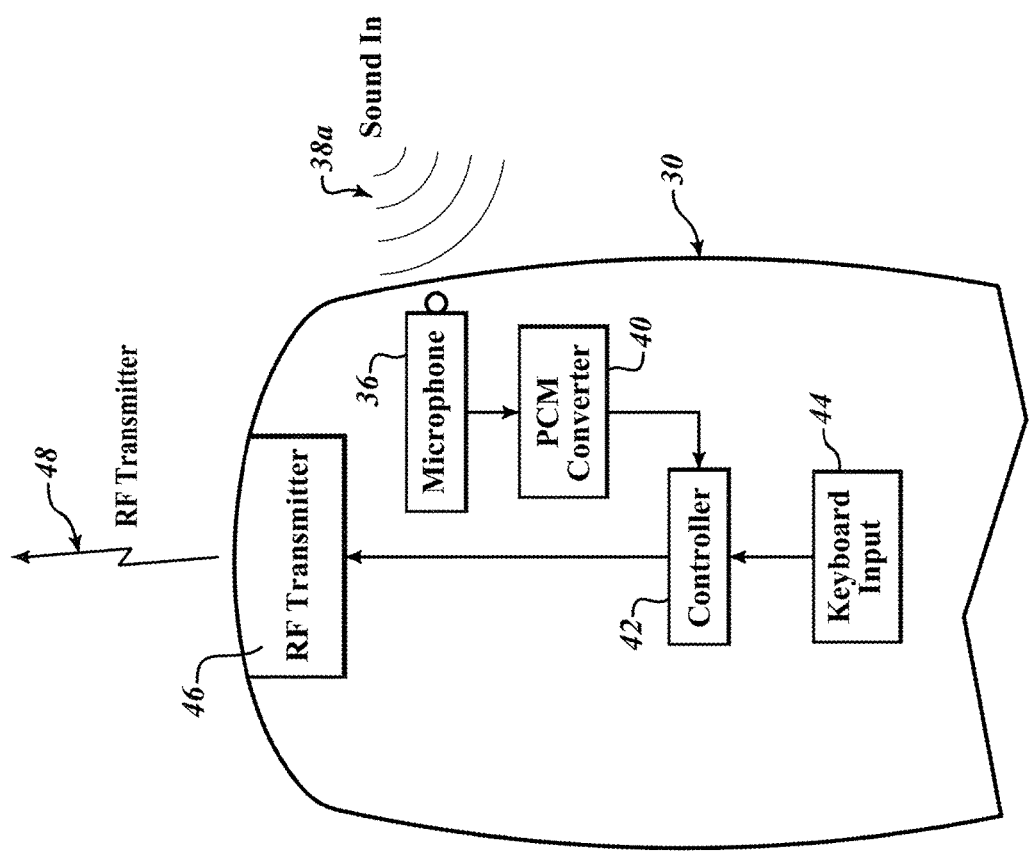
FIG. 3 is a block diagram of the details of a remote control that can be matched to different A/V systems using principles as taught herein.

As shown in FIGS. 2 and 3, according to the principles and disclosures taught herein, each remote control 30 contains a microphone 36. The microphone 36 picks up sound waves 38 which emanate from speakers 24. These sound waves 38 are heard by the user 28 and they are also picked up by the microphone 36. The microphone therefore hears the sound waves 38 that are emitted by speaker 22 of the A/V system 12 that is within audio range of the remote control 30.

FIG. 3 shows the details of the sum of the circuits inside of the remote control 30. The sound wave 38a is received by the microphone 36 inside the remote control 30. After the microphone 36 picks up the sound wave 38a, it is converted to a PCM signal in the PCM converter 40.

PCM converters are well known in the art and any of the many known PCM converters available today can be used. One of the more common PCM converters creates an LPCM signal, which is the abbreviation for Linear Pulse Code Modulated audio. The conversion of an audio signal to an LPCM digital signal is well known in the art and can be accomplished by any acceptable technique in the PCM converter 40. The PCM converter 40 outputs the LPCM signal to the controller 42. The controller 42 is connected to receive input from a keyboard input 44 which is on the remote 30. The controller 42 is also connected to output through an RF transmitter 46. The RF transmitter 46 outputs an RF signal 48 which is transmitted as the standard radio signal and received by any antenna within the range of the remote control 30, which may be approximately one hundred feet or more. The signal 48 which is output by the RF transmitter 46 may contain two distinct different types of data. It may contain data from the keyboard input 44 which receives input from the user 28. Namely, when the user presses keys 44 on the remote control, these pass to the controller 42 and from thence to the RF transmitter 46 to transmit the control data as part of signal 48 for controlling operation of the A/V system 12 in a manner well known in the art, such as to change channels, change the volume, and the like. According to the inventive principles as taught herein, the RF transmitter 46 will also transmit PCM sound data in the radio signal 48. Namely, it may transmit the PCM signal of the audio 38a which was output by the PCM converter 44. The radio signal 48 contains the PCM of audio data 38a which is transmitted as another type of data output by the remote control 30.

Turning now to FIG. 2, the remote control 30 as shown in FIG. 2 has the internal structure and operation as described with respect to FIG. 3. Accordingly, the signal 48 output by the remote control 30 in FIG. 2 contains the PCM signal corresponding to the audio 38 which has been picked up by the microphone 36.

The sound 38a received at the microphone 36 in the remote 30 will have two components. The first component will be the sound 38 output by the speaker 24 of the A/V system that the remote control 30 is adjacent to. In addition, another component will be the local sound in that particular room. As can be expected, in a particular room, people may be talking to each other, walking, sitting down, or making other noises. In addition, some equipment may be on, such as a fan, an air conditioner, a radio, or there may be other local sounds, such as a dog parking and the like. Thus, the input sound 38*a* to the remote control 30 will be a combination of all sounds that are received at the microphone 36. In most instances, the sound 38 from the speaker 24 will be the most dominant and will also be the most continuous. As can be expected, the other sounds will generally be much softer and also intermittent. It is quite common in a room in which the TV is being viewed, that the sound output by the TV speakers 24 will be the loudest, otherwise the users watching the TV would not be able to hear what is being broadcast and spoken by the people in the audiovisual presentation. Accordingly, it can be expected that the sound 38 from the speakers 24 will be the most dominant sound, and in most instances will be so significantly dominant that the other sounds will be at much lower volume.

In one embodiment, all of the sound 38 received at the microphone 36 is broadcast on RF signal 48 towards the controller 26. The controller 26 contains sufficient processing power in order to filter and separate out the different types of sound 38*a* received at the microphone 36. It will be able to recognize individual words spoken by the user for the command of the system and thus change the volume up and down, change channels, and take other action based on the spoken input by the user, which is received by the microphone 36. It will also be able to filter out and segregate the sound 38*a* which has been output by the speaker 24 in order to perform a comparison with the sound that was output to the speakers.

Controller 26 operates as follows according to one embodiment. An A/V program is received on the input cable 18. This A/V program has a format which is compatible with the particular controller 26, whether a set-top box, a computer, or the like. The signal is then input to the control circuit 50 for processing so that it may be provided for viewing on the screen 22 with the audio being delivered to the speakers 24 based on the program that the user has selected for viewing. In particular, the audio that the user has selected for viewing leaves the control circuit 50 via line 52 and is delivered to an interface circuit 54 and then to the speakers 24 so they may output the sound 38. Similarly, the video data is provided to a video interface circuit 56 which delivers the video to the screen 22 for viewing. The audio interface 54 also provides the audio program input to a compare module 58 in addition to providing the same signal to the speakers 24.

The remote 30 transmits the soundwave 38*a* that it receives from its local surroundings to the controller 26 where it is received by antenna 60. The antenna 60 performs proper filtering, smoothing, in filter circuit 62, which may include different types of voice recognition, splitting the soundwave 38*a* into its original components 38 from the speaker 24, and another portion that has been received from the surrounding room environment, as previously discussed. This can be done based on a volume filter or some other technique. The filtered sound wave is then delivered from the filter 62 to an interface circuit 64 which provides the component of audio 38 from the remote control 30 to the compare module 58.

The compare module 58 receives input from two different sources, first from the audio program input 54 which is the same content delivered to the speakers 24 and second from the audio signal that originated from the remote 30 which was delivered via the interface circuit 64. The compare module 58 compares the PCM signal from these two inputs to each other. If they are the same audio data, then the A/V system 12 concludes that the particular remote 30 which output the signal 48, is in close proximity to the particular A/V system 12. It can therefore determine that the remote 30 is a match to the particular A/V system 12.

The comparison in the compare module 58 of the two PCM signals, one from the audio program input 54 and the other of the audio from the remote 64, can be done by any technique well known in the art. Generally, the type of PCM signal used will be an LPCM signal which is well known for ease and comparison to other LPCM signals. There are numerous techniques well known and published in the art for comparing LPCM signals to each other and any of the many published techniques are acceptable for use in the compare module 58 to determine whether the audio from the program input 54 is a match to the audio from the remote circuit 64.

The module 58 will also perform the proper time shift of the two signals coming from the respective sources. As can be appreciated, the direct audio program input 54 will be slightly ahead from a timing standpoint from the audio 38 that comes from the remote circuit 64. Since the audio program input from circuit 54 is available immediately, prior to it being translated to speakers 24, it will be the first signal to arrive at the compare module 58. After some slight delay time, based on the amount of time required for the speaker 24 to output the sound 38, for it to travel through the air, be received within the signal 38*a* at the remote control 30, then to be transmitted on the signal 48, properly received at antenna 60, and then transmitted from circuit 64, there will be some slight delay in the signal component 38 which originates from soundwave 38*a* at the microphone 36. The compare module 58 will perform a time delay adjustment in order to properly align the timing of the two signals so that the PCM of the signal 38 sent to the speakers 24 by circuit 54 is time aligned with the PCM data for that same soundwave received at the remote control 30 and sent by circuit 64 so that a proper comparison can take place. The amount of time shift needed can be easily determined by a number of techniques such as performing a sample of the time delay expected in the system, comparing the signals over several samples and then finding the matching portions of the two signals after which a shift is done for proper time alignment, or any other technique to properly align the timing of the two signals for comparison of the data for audio 38 in the compare module 58.

If the compare module 58 determines that there is a match between the sound output by the control circuit 50 input from interface 54 for the audio delivery to the speakers 24 and the sound that is received on the audio from the remote 30 via the circuit 64, it will then output a signal to the controller circuit 50 indicating that there is a match between that particular remote control 30 and the audio data which is being output by the control circuit 50 to the speakers 24 of its own system. The control circuit 50 will then register that particular remote control 30 as a match to the controller 26. The controller 26 will then send a signal to its remote control interface circuit so that it will now recognize and receive input from the remote control 30 with which it has now been matched.

Previously, the controller 26 is paired with a specific remote control and will respond only to input signals from that particular remote control 30 with which it is paired, and will ignore all other RF signals that it receives, whether from cell phones, radios, other remote controls, or other sources. After it receives a matching signal indicator from the compare module 58, the controller 26 will now switch to also receive control input signals from the remote control 30 that is identified to it by the compare module 58 as matching. Specifically, the RF signal 48 as transmitted by a particular remote control 30 contains not only the sound waves 38a at the microphone but also contains identifying data which identifies that individual remote 30. Each remote 30 has its own identifying code so that it can be uniquely identified of all remote controls 30 which may be available on the network 10. The RF signal 48 contains other data as well, such as an indication of any keys 44 which have been pressed, voice commands by the user to the system 28 which are also received on microphone 36 and numerous other specific data that any remote control 30 may exchange with the controller 26.

When an A/V system 12 is matched with a particular remote control 30, it will now respond to input from the remote control. The newly matched remote control can now change channels, volume, and provide other input.

According to one embodiment, the A/V system 12 continues to be paired with the remote control that it was paired with prior to the match being established. In this embodiment, the A/V system 12 will recognize and respond to inputs from two different remote controls 30, the remote control 30b that it was originally paired with and also the newly matched remote control 30a. Thus, either of the remote controls 30 can change the channel, increase the volume or provide other instructions that will be received at the antenna 60 and then processed by the controller 26 in order to carry out the instructions which have been received from either of the two respective remote controls. In another embodiment, once a new remote control 30a is matched to the A/V system 12b, the prior remote control 30b that it was paired with has a block indicator placed inside the controller 26 to not be responsive to that particular remote control 30b. Namely, after a new match occurs, the controller 26 enters a mode in which it responds only to the newly matched remote control 30, in one embodiment.

Figure 4:
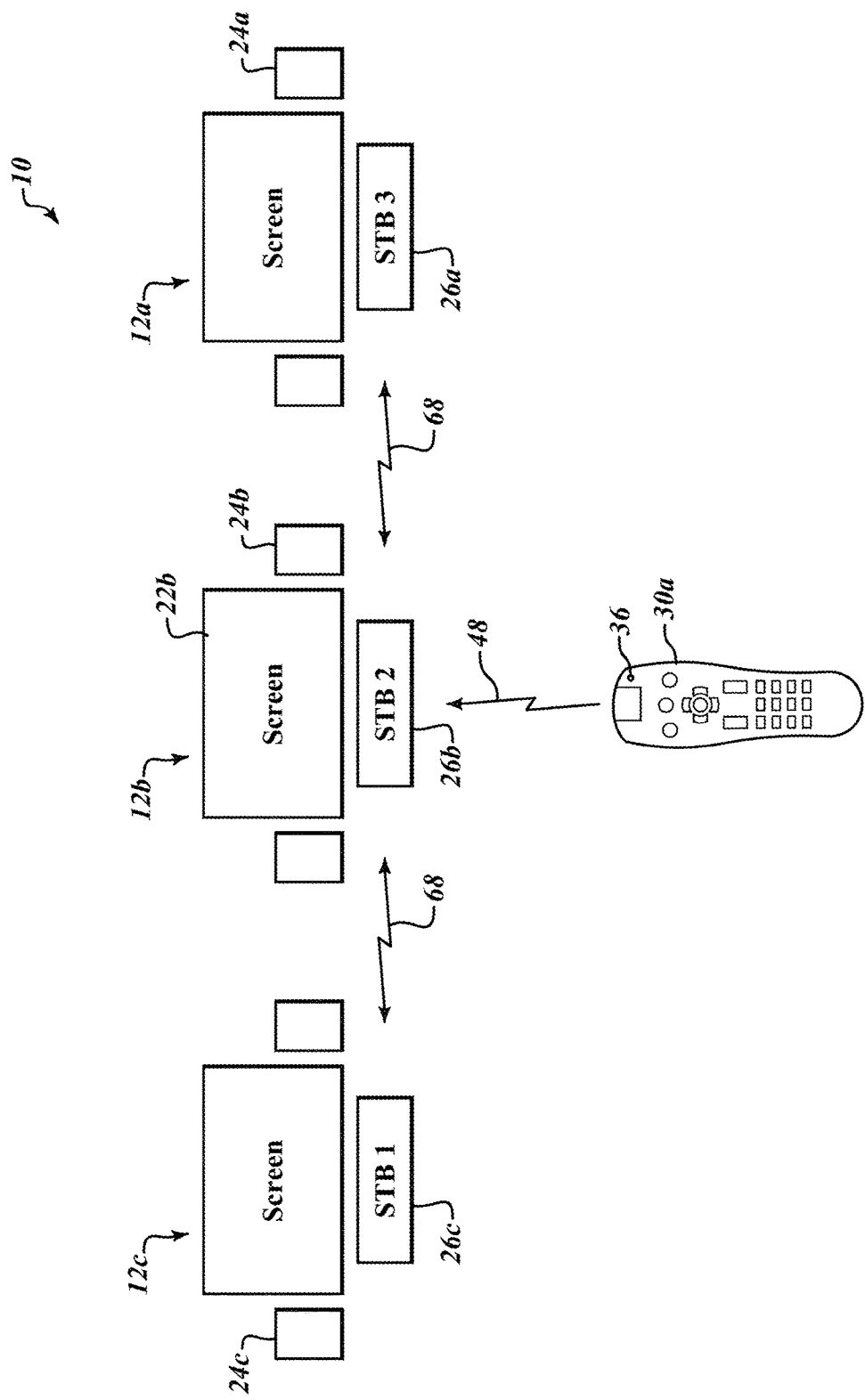
FIG. 4 is a block diagram of a remote control which is being matched to a different A/V system to which is it paired, and illustrates the communication between the different A/V systems on a single network.

FIG. 4 illustrates the network 10 in which each of the A/V systems 12a, 12b, 12c interact based on a new match being created. In the example of FIG. 4, the remote 30a is originally paired with the A/V system 12a. The user carries the remote control 30a to be in sufficient proximity to the A/V system 12b that the sound output from speakers 24b is received at the microphone 30a. The remote control 30a becomes matched to the A/V system 12b in a manner previously described. Once this match is established, the controller 26b sends out signals 68 to all other controllers 26a and 26c on the system. The signal 68 indicates to the other controllers 26a and 26c on the system that the remote 30a has now been matched to the A/V system 12b. Upon the other A/V systems 12, in this case 12a and 12c, receiving the new match indication signal 68, these systems will enter a mode in which they do not respond the remote control 30a. According to one embodiment, after the remote control 30a is matched to a new A/V system, such as 12b, then the A/V system 12a with which it was previously matched will enter a mode in which it does not respond to input from the remote 30a. This will prevent the situation in which the user can have the remote control 30 in one room and the signal is received by an A/V system in a different room and causes the channel to change, the volume to change, or other operations.

In an alternative embodiment, it may be desired to permit the remote control 30a to continue to issue commands to, and have the commands carried out by, the A/V system 12a with which it has been previously paired. According to this embodiment, the remote control 30a will now control two A/V systems, the first is 12a to which has been originally paired and the new system 12b to which it is temporarily matched.

There may be some situations in which a single remote control 30 may have the audio signal that it receives match with multiple A/V systems 12. In some instances, an A/V system 12 in one room will be sufficiently loud that it can be heard in another room which contains its own A/V system. In such an instance, the remote control 30 for the first system will be receiving two audio signals from two different speakers, the speaker in the room in which it is located, for example 24a, and also audio signals from the speaker in the other room, 24b. The remote control 30a will send out an RF signal 48 providing all the audio data which it has received in its microphone 36. In some instances, this will match with two different A/V systems 12. In one embodiment, for the case of multiple matches due to the noise output from the A/V systems being both received by the same remote control 30, this will be treated as if no matches had taken place and, therefore, there will be no change in which controller 26 is controlled by any particular remote control 30. In one alternative, it is also possible to have the remote control 30 matched simultaneously to each of the A/V systems 12 for which it receives an audio signal. This would, therefore, permit the signal remote control to simultaneously change channels or change the volume or input other instructions to the two different A/V systems 12.

Another embodiment provides the use of a central server, such as a central controller 26 which receives the audio data from each of the remote controls 30 of the network 10. Some networks 10 contain a single central server which operates as a master controller 26. In a situation in which there is a master set-top box, one of the set-top boxes may have significant processing power and act as a central controller, for example, for Dish Network, this is the Hopper®, and other controllers 26 have much less processing power and merely pass the signal along, known in the Dish Network system as Joey®. In networks of this type, in one embodiment, the master controller 26 which has the most processing power can receive the audio data from each remote control 30 of the entire system. As previously state, the RF signal 48 is sufficiently strong to be received on any antenna within 100 feet of the controller and, thus, the master controller 26 can receive the RF signal 48 from multiple remote controls 30 at the same time. The master controller 26 also receives the full A/V signal which contains both video and audio data which is being provided to each of the A/V systems 12 in the remote rooms. In this embodiment, the master controller 26 compares the audio data for each of the microphones 36 that remote controls 30 have received with the audio data which is being provided from the satellite cable 18 to each of the different A/V systems 12 throughout the entire network. The master controller 26 will then decide which of the controllers 26 are to be matched with which remote control 30. It then sends a signal to all controllers 26 on the system with the results of the comparison so that each system knows which remote control is to control it. In this case, the decision-making process occurs centrally, and then the result is broadcast to all controllers 26 on the network. Each of the controllers 26 is, therefore, programmed to be responsive to the particular remote control 30 which is receiving the same audio signal that it is outputting.

In one embodiment, the controller 26 which had the most recent audio data match with a particular remote control 30 will be the only controller 26 that responds to data input from that particular remote control 30 and all other controllers 26 of the network will ignore its signals. There will frequently be situations in which there are no matches between a remote's audio data which it receives at its microphone 36 and any of the controllers 26 which are outputting audio signals to their respective signals 24. This may occur, for example, if there is too much background noise in the room where the remote is located, if the audio output 38 is soft, if the remote control is under a blanket, or for other reasons. According to one embodiment, this circumstance is handled by maintaining each controller 26 to be responsive to the remote control 30 to which it was originally paired. The change to a new remote control 30 will only be carried out if there is a distinct, clear match. According to another alternative embodiment, the controller 26 will be responsive to the remote control 30 with which it was most recently matched. A new match will be required to change the control for that remote control 30.

As previously described herein, there is a distinction between remote control 30 being paired with a controller 26 and being matched with it. In the situation of a pairing, this creates a one-to-one correspondence between the unique A/V system 12 that the remote control 30 will control and the unique remote control 30 that the A/V system 12 will respond to. This paring normally takes place at the original setup of the network 10. The matching of remote control 30 does not replace or remove the pairing which has taken place. Rather, the matching of the remote control 30 to a new A/V system 12 will permit that remote control 30 to have its commands recognized by the new A/V system so long as that new match is maintained.

The match of the remote control 30 to an A/V system 12 is checked and confirmed on a regular, usually periodic, basis. The checking can take place at any desired interval, such as once every five minutes or over a shorter period of time such as several times a minute. When the remote control is matched to a new system, it still maintains in its memory the A/V system 12 to which it has been paired, as does the A/V system 12. Thus, if all systems are turned off, so that none of them emitting sound and the microphone 36 of the remote control 30 is receiving no sound it can reset after a period of time to control the A/V system 12 to which it was originally paired. For example, the system could default to its paired remote control and A/V system 12 each night for a nightly reset. In another alternative, the A/V system 12 will always respond to the remote control 30 with which it was most recently matched, and for a period of time it will block all other signals from all other remote controls 30 to which it has been paired or previously matched. In this embodiment, the A/V system 12 responds only to the remote control 30 with which it was most recently matched. This situation can be on a temporary basis, for example, after 24 hours the A/V system 12 will respond to both the remote control 30 with which it was paired originally and also the one with which it was mostly recently matched. This is beneficial in the event the original remote control with which it has been paired has been lost so that the match is always maintained. However, if after several days the original remote control 30 is found this gives an opportunity for the original remote control 30 to once again be used to control the A/V system 12 with which it was originally paired. Once a remote control 30 is no longer matched to a particular A/V system, then a signal is sent to the other A/V systems or, alternatively, back to the other remote controls 30, indicating that the previous match has been terminated and the original pairing is in place or a new match has been made.

There may be some situations in which an A/V system 12 in a particular room is turned off. In this case, the microphone 36 on the remote control 30 will not pick up any audio data from the speakers 24 and, thus, it will not be able to create a new match with that particular A/V system 12. There are a number of ways to handle this particular situation, any one of which would be acceptable. Of course, one easy technique is that the user may manually press the ON button of the A/V system 12 which he is standing in front of holding the remote control 30. Once the A/V system 12 is turned on, it will begin to broadcast sound out of the speakers 24 which will be immediately received by the remote control 30 and the matching can take place, so the remote control 30 can now be matched and carry out the control of the A/V system 12. Another possible approach is to have remote control 30*b* that has both radio and infrared signals which can be output. The infrared can respond to certain keys, such as the power ON key and the radio signal provides the audio data. The infrared is a line of sight and all controllers 26 which are in the line of sight can respond to an infrared signal. Once the system is turned on, the microphone 36 on the remote control 30 will pick up the audio output from the speakers 24 and in a brief time, the remote control 30 will be matched to that particular A/V system 12.

Yet another possible solution is that the microphone 36 and the remote control 30 will pick up ambient sounds in the room in which it is located. This may be people talking, doors being opened and closed, or other audio sounds which are common in rooms. Frequently, a controller 26 will have a microphone mounted on it as well. Such a microphone may be present in order to respond to user commands or take other action. In this situation, the microphone on the controller 26 would be receiving the same ambient sounds that the remote control 30 is receiving. The remote control 30 will output a PCM signal corresponding to the audio data that is received which is then sent to the controller 26. In the embodiment in which the controller 26 has its own microphone, it will compare the audio data received at its own microphone with the audio data which it has received from the remote control 30 that corresponds to the audio signal received in its microphone. If there's a match of these two microphones, then the remote control 30 will be considered to match with that particular A/V system 12 and will be able to turn it on and issue other commands. There may be numerous other solutions to the situation in which A/V system 12 is completely turned off and it is desired to make a new match with remote control 30.

Figure 5:
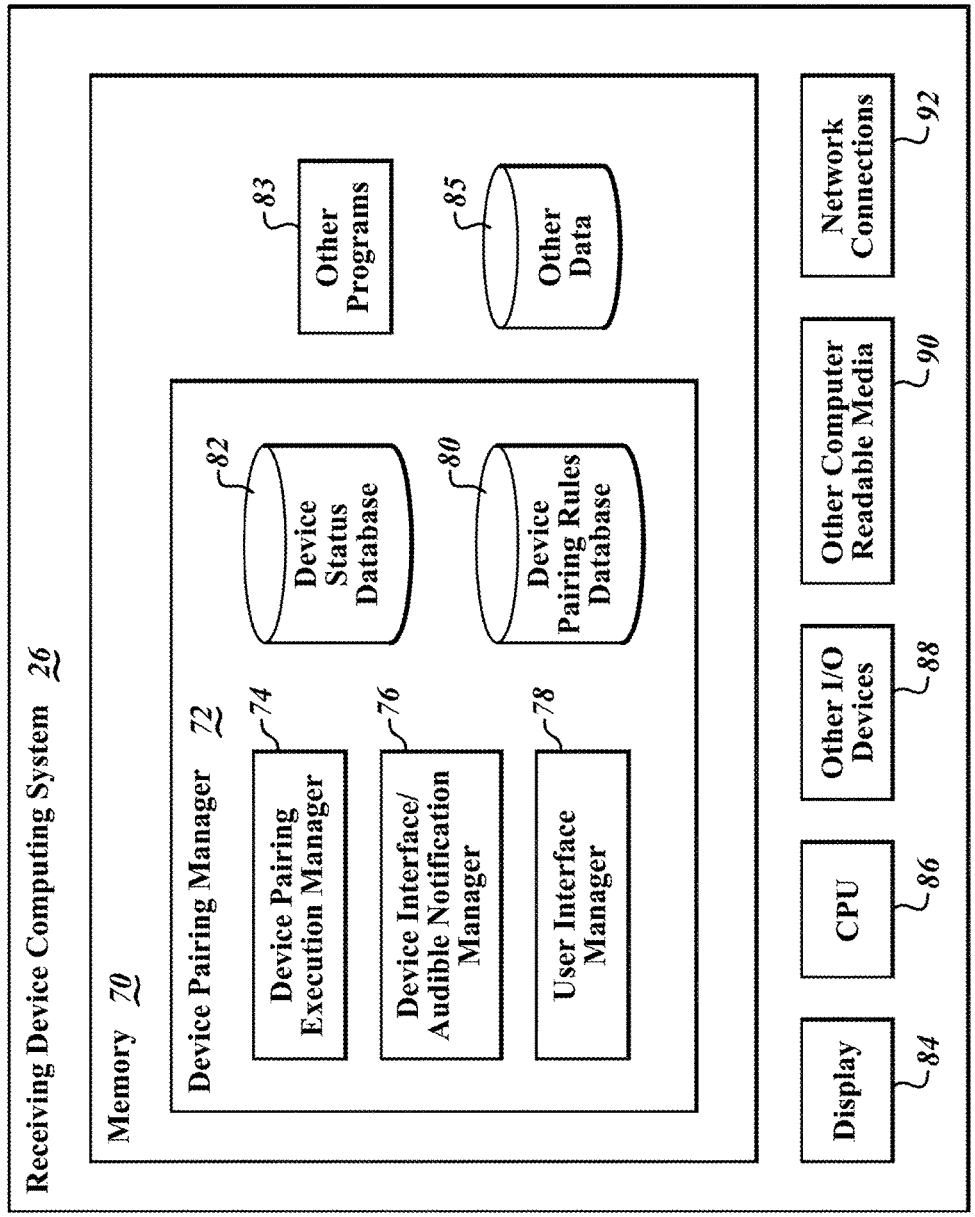
FIG. 5 is the system inside the server, which may be located in any one or all of the A/V systems which contains the memory, processors, circuits, and connections to carry out the embodiments as described herein.

FIG. 5 is a block diagram showing the internal structure of one sample controller 26. As previously mentioned, the controller 26 can be a TV receiver, set-top box, computer, or other processor that can control an A/V system 12. The controller 26 contains a memory 70 which contains instruction sets, programs, and data. The memory has stored therein a pairing device manager 72 which has a number of routines which can execute thereon. One of the routines is a device pairing execution manager 74. Another is a device audible notification manager 76 and another is a user interface manager 78. Each of these resides in the controller 26 as shown in FIG. 2, as previously described.

The device pairing execution manager 74 will interact with the device rules database 80 and the device status database 82 in order to carry out the new matching function as previously described. The controller 26 may have other programs 83 and 85 stored in the memory 70. In addition, the controller 26 may have additional devices, hardware and software. It may include its own small display 84. Further, the controller 26 will include a plurality of CPUs 86. The CPUs 86 will act as central processing units to implement the control circuit 50, as well as to carry out the other functions described herein. The controller 26 may also include other I/O devices 88, other computer readable media such as DVDs, CDs and other operations as well as numerous network connections 92.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A first audio/visual system comprising:
an input circuit housed within a set top box that receives audio/visual program data that has an audio portion and a video portion;
a display that receives the video portion and displays the video portion for viewing by a user;
a memory housed within the set top box storing the audio portion of the audio/visual program data;
a speaker that receives the audio portion of the audio/visual program data sent from the memory and broadcasts the audio portion as sound to be heard by the user;
a control circuit housed within the set top box that receives the audio/visual program data and transmits the video portion to the display and the audio portion to the speaker;
a remote control device that controls the control circuit's operation to control the presentation of the video program on the display and broadcast the audio portion by the speakers, the remote control device having a housing;
a microphone in the housing of the remote control device, the microphone receiving the broadcast audio portion from the speaker;
a transmitting antenna in the housing of the remote control device that transmits the received broadcast audio portion from the speaker to the control circuit;
a compare circuit within the control circuit that compares the received broadcast audio portion from the speaker via the remote control device with the stored audio portion from the memory that was transmitted to the speaker; and
a match circuit that outputs a match signal when the received broadcast audio portion from the speaker via the remote control device matches the stored audio signal from the memory that was sent to the speaker,
wherein the remote control device is paired with the set top box in response to the match circuit outputting the match signal,
wherein the compare circuit performs a time shift of the received broadcast audio portion from the speaker and the stored audio portion from the memory to time align the received broadcast audio portion from the speaker with the stored audio portion from the memory.

2. The system according to claim 1, further comprising a second audio/visual system on a same network as the first audio/visual system, the second audio/visual system receiving the transmitted broadcast audio portion;
a blocking circuit that blocks the second audio/visual system from responding to the remote control device that controls the control circuit's operation to control the presentation of the video program data on the display and broadcasting the audio data on the second audio/visual system.

3. The system according to claim 1, further comprising other devices, wherein, when the first audio/visual system is paired to the remote control device, the first audio/visual system disables the other devices from controlling the first audio/visual system.

4. The system according to claim 1, further comprising other devices, wherein the first audio/visual system has a unique paring to a specific device and, when the controller decides that the signal from one of the other devices matches the data, builds a temporary matching of the remote control device to the one of the other devices.

5. The system according to claim 4, wherein the temporary matching is confirmed on a periodic basis.

6. A remote control device, comprising:
a microphone picking up a sound that is broadcast by a set top box via a speaker;
storing sound data in the set top box that corresponds to the broadcast sound from the speaker;
a converter converting the broadcast sound from the speaker to a signal that represents the broadcast sound from the speaker; and
a transmitter transmitting the signal that represents the broadcast sound from the speaker to the set top box,
wherein, when the set top box determines that the signal that represents the broadcast sound from the speaker matches the sound data stored in the set top box, the remote control device is paired to the set top box and enables the remote control device to control the set top box,
wherein the set top box performs a time shift of the received broadcast audio portion from the speaker and the stored audio portion from the memory to time align the received broadcast audio portion from the speaker with the stored audio portion from the memory.

7. The device according to claim 6, wherein the signal includes voice command data to control the set top box.

8. The device according to claim 7, wherein the broadcast sound includes a voice command, and wherein the voice command is converted to voice command data.

9. The device according to claim 6, further comprising other set top boxes, wherein the remote control device has a unique paring to a certain set top box and, when one of the other set top boxes decides that the signal from the remote control device matches sound data stored in the one of the other set top boxes, builds a temporary paring to the one of the other set top boxes.

10. A system, comprising:
a set top box and a remote control device;
the set top box, comprising:
a memory storing sound data that corresponds to a sound;
a speaker broadcasting the sound;

an antenna receiving a signal from the remote control device that represents broadcast sound from the speaker; and a controller comparing the signal that represents broadcast sound from the speaker to the sound data, the remote control device, comprising:

a microphone that picks up the broadcast sound from the speaker;

a converter that converts the broadcast sound from the speaker to the representative signal; and a transmitter that transmits the signal to the set top box, wherein, when the set top box determines that the signal that represents broadcast sound from the speaker matches the sound data, the set top box is paired to the remote control device and enables the remote control device to control the set top box, wherein the set top box performs a time shift of the received broadcast audio portion from the speaker and the stored audio portion from the memory to time align the received broadcast audio portion from the speaker with the stored audio portion from the memory.

11. A method for matching a remote control device and an a/v apparatus, comprising:

broadcasting a sound, via a speaker, stored in the audio/visual apparatus, the audio/visual apparatus including a set-top box;

storing sound data in the set top box that corresponds to the broadcast sound from the speaker;

picking up the broadcast sound from the speaker in the remote control device via a microphone;

converting the broadcast sound from the speaker to an RF signal in the remote control device;

transmitting the RF signal that represents the broadcast sound from the speaker to the audio/visual apparatus from the remote control device;

comparing the RF signal that represents the broadcast sound from the speaker with the sound data stored in the set top box;

outputting a match signal when the RF signal that represents the broadcast sound from the speaker matches the sound data stored in the set top box;

pairing the remote control device to the set top box and enabling the remote control device to control the set top box, when the set top box determines the RF signal matches the sound data stored in the set top box, wherein the set top box performs a time shift of the received broadcast audio portion from the speaker and the stored audio portion from the memory to time align the received broadcast audio portion from the speaker with the stored audio portion from the memory.

* * * * *